United States Patent [19]

Ohno et al.

[11] Patent Number: 5,328,819

[45] Date of Patent: Jul. 12, 1994

[54] SILVER HALIDE PHOTOGRAPHIC MATERIAL CONTAINING ISOMETHINE DYES

[75] Inventors: Shigeru Ohno; Yukio Miyaki; Shigeru Yamazaki, all of Kanagawa, Japan

[73] Assignee: Fuji Photo Film Co., Ltd., Kanagawa, Japan

[21] Appl. No.: 928,433

[22] Filed: Aug. 12, 1992

[30] Foreign Application Priority Data

Aug. 15, 1991 [JP] Japan ................... 3-228527

[51] Int. Cl.$^5$ ............................................. G03C 1/84
[52] U.S. Cl. ........................................ 430/522; 430/510; 430/517; 552/304; 552/307
[58] Field of Search ................ 430/522, 510, 517; 552/304, 307

[56] References Cited

U.S. PATENT DOCUMENTS 5,173,395 12/1992 Asami ................... 430/522

*Primary Examiner*—Jack P. Brammer
*Attorney, Agent, or Firm*—Sughrue, Mion, Zinn, Macpeak & Seas

[57] ABSTRACT

An azomethine dye represented by the following general formula (I)

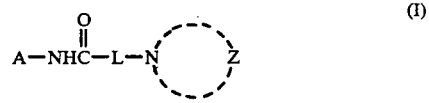

wherein A represents a dye residue formed by removing one hydrogen atom from an indophenol or indoaniline dye; L represents a divalent bonding group; and Z represents a non-metallic atomic group required for forming a three-membered to eight-membered heterocyclic ring together with N, provided that a carbonyl group is not directly bonded to N in the heterocyclic ring. Also disclosed is a silver halide photographic material having an emulsion layer with a covering power of at least 60, and wherein the silver halide photographic material contains at least one member of the dyes of general formula (I) in such an amount that an increase in transmission density in unexposed areas caused by the incorporation of the dye therein after development is not more than 0.06.

4 Claims, No Drawings

SILVER HALIDE PHOTOGRAPHIC MATERIAL CONTAINING ISOMETHINE DYES

FIELD OF THE INVENTION

This invention relates to a novel indophenol dye or indoaniline dye. This invention also relates to a silver halide photographic material which contains the dye to reduce the yellowing tone of a silver image.

BACKGROUND OF THE INVENTION

Many dyes derived from phenol derivatives or naphthol derivatives are known and include indophenol dyes and indoaniline dyes. These conventional dyes are useful as a skeleton which gives a bluish tone, and can be long-waved to the region near the infrared rays by modifying the skeleton with substituent groups. However, conventional dyes have a low molar extinction coefficient. Hence, a large amount of the dye must be used to obtain a desired density. Further, only some of the conventional dyes have sufficient fastness to heat and light.

Furthermore, the covering power of silver halide emulsions is an important factor for emulsion manufacturers. When an emulsion having a high covering power is used, the amount of silver required to provide a specific optical density can be controlled. Though the color tone of developed silver of emulsion grains which have a high covering power varies depending on grain size and thickness, the tone is yellowish and unpleasant to image observers. The yellowing phenomenon is caused by the reduced size and thickness of the developed silver. The reduction in grain size and thickness results in an increase in the scattering of the blue light component causing light which has a highly yellowish tone to be emitted. Accordingly, substantially water-insoluble dyes have been used to control the tone and to thereby prevent yellowing as disclosed in JP-A-60-154251 (the term "JP-A" as used herein means an "unexamined published Japanese patent application") and JP-A-61-285445. However, when dyes having a conventional structure are used, there is the disadvantage that the dyes have a secondary absorption in the region of light having a wavelength shorter than that of light in the principal absorption region. The yellowing of the image is caused by the secondary absorption. Further, when conventional dyes are added to silver halide emulsion layers, there is the disadvantage that the sensitivity of silver halide emulsions is lowered.

SUMMARY OF THE INVENTION

An object of the present invention is to provide an indophenol or indoaniline dye which gives a high absorption density.

Another object of the present invention is to provide a silver halide photographic material which prevents the yellowing of images.

The present inventors have found that the problems associated with prior art as mentioned above can be solved by providing an azomethine dye represented by the following general formula (I):

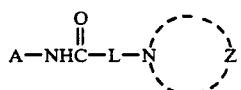
(I)

wherein A represents a dye residue formed by removing one hydrogen atom from an indophenol or indoaniline dye; L represents a divalent bonding group; and Z represents a non-metallic atomic group required for forming a three-membered to eight-membered heterocyclic ring together with N, provided that there is no case where a carbonyl group is directly bonded to N in the heterocyclic ring.

Further, the present inventors have found that the above-described problems can be solved by providing a silver halide photographic material containing at least one member of the compounds of general formula (I).

Furthermore, the present inventors have found that the above-described problems can be solved by providing a silver halide photographic material comprising a support having on at least one side thereof at least one silver halide photographic emulsion layer, wherein the silver halide emulsion layer has a covering power of at least 60, and the dye of general formula (I) is contained in the silver halide emulsion layer and/or another layer in such an amount that an increase in transmission density in unexposed areas caused by the incorporation of the dye in the layer after development is 0.06 or less.

DETAILED DESCRIPTION OF THE INVENTION

The compounds of general formula (I) will be illustrated in more detail below.

In general formula (I), "A" represents a dye residue formed by removing one hydrogen atom from an indophenol or indoaniline dye. Preferred indophenol or indoaniline dyes represented by AH are compounds represented by the following general formula (A-1), (A-2), (A-3), (A-4), (A-5) or (A-6):

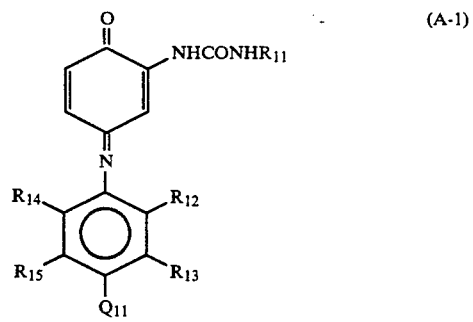

wherein $R_{11}$ represents an aryl group; $R_{12}$, $R_{13}$, $R_{14}$ and $R_{15}$ may be the same as or different from each other, and each represents a hydrogen atom, an alkyl group, an aryl group, $OR_{16}$, $NR_{16}R_{17}$, $NR_{17}COR_{18}$, $NR_{17}SO_2R_{18}$, $SR_{18}$, $SO_2R_{18}$, $COOR_{16}$, $CONR_{16}R_{17}$, $SO_2NR_{16}R_{17}$, $NR_{17}COOR_{18}$, a halogen atom, a cyano group or a nitro group; $Q_{11}$ represents a hydroxyl group or $NR_{16}R_{17}$; $R_{12}$ and $R_{13}$, $R_{13}$ and $Q_{11}$, or $R_{15}$ and $Q_{11}$ may be combined together to form a five-membered or six-membered ring; $R_{16}$ and $R_{17}$ each represents a hydrogen atom or a group of $R_{18}$; $R_{18}$ represents an alkyl group, an aryl group or a heterocyclic group; or $R_{16}$ and $R_{17}$, or $R_{17}$ and $R_{18}$ may be combined together to form a five-membered or six-membered ring;

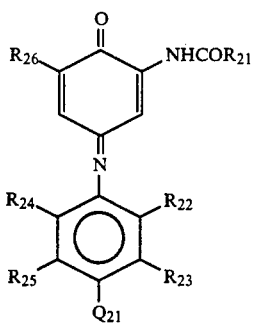

(A-2)

wherein $R_{21}$ represents an alkyl group, an aryl group or a heterocyclic group; $R_{26}$ represents a halogen atom, $OR_{27}$, $NR_{27}R_{28}$, $NR_{28}COR_{29}$ or $NR_{28}SO_2R_{29}$; $R_{22}$, $R_{23}$, $R_{24}$, $R_{25}$ and $Q_{21}$ have the same meaning as $R_{12}$, $R_{13}$, $R_{14}$, $R_{15}$ and $Q_{11}$ in general formula (A-1), respectively; and $R_{27}$, $R_{28}$ and $R_{29}$ have the same meaning as $R_{16}$, $R_{17}$ and $R_{18}$ in general formula (A-1), respectively;

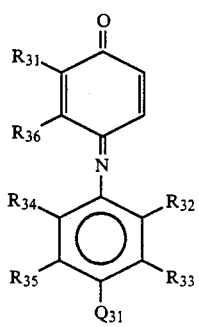

(A-3)

wherein $R_{31}$ represents a hydrogen atom, a halogen atom, $OR_{37}$, $NR_{37}R_{38}$, $NR_{38}COR_{39}$ or $NR_{38}SO_2R_{39}$; $R_{36}$ represents a hydrogen atom, an alkyl group, $OR_{37}$ or $NR_{38}R_{39}$; $R_{32}$, $R_{33}$, $R_{34}$, $R_{35}$ and $Q_{31}$ have the same meaning as $R_{12}$, $R_{13}$, $R_{14}$, $R_{15}$ and $Q_{11}$ in general formula (A-1), respectively; and $R_{37}$, $R_{38}$ and $R_{39}$ have the same meaning as $R_{16}$, $R_{17}$ and $R_{18}$ in general formula (A-1), respectively;

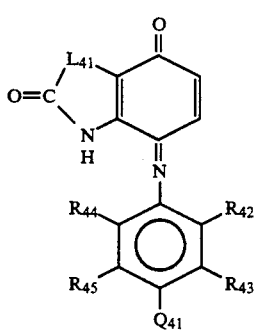

(A-4)

wherein $L_{41}$ represents an alkylene group having 1 to 24 carbon atoms, a carbonylimino group having 1 to 24 carbon atoms or an imino group having 0 to 24 carbon atoms; and $R_{42}$, $R_{43}$, $R_{44}$, $R_{45}$ and $Q_{41}$ have the same meaning as $R_{12}$, $R_{13}$, $R_{14}$, $R_{15}$ and $Q_{11}$ in general formula (A-1), respectively;

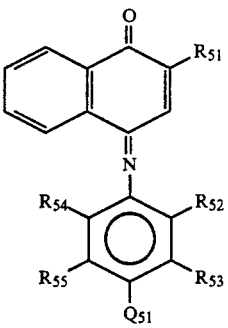

(A-5)

wherein $R_{51}$ represents a hydrogen atom, a halogen atom, $CONR_{56}R_{57}$ or $SO_2NR_{56}R_{57}$; $R_{52}$, $R_{53}$, $R_{54}$, $R_{55}$ and $Q_{51}$ have the same meaning as $R_{12}$, $R_{13}$, $R_{14}$, $R_{15}$ and $Q_{11}$ in general formula (A-1), respectively; and $R_{56}$ and $R_{57}$ have the same meaning as $R_{16}$ and $R_{17}$ in general formula (A-1), respectively;

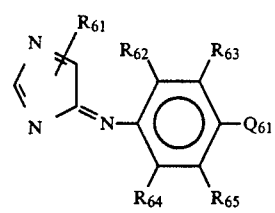

(A-6)

wherein $R_{61}$ represents a hydrogen atom, an alkyl group, an aryl group, a heterocyclic group, $NR_{67}COR_{68}$, $NR_{67}SO_2R_{68}$, $NR_{66}CONR_{66}R_{67}$ or $NR_{67}COOR_{68}$; $R_{62}$, $R_{63}$, $R_{64}$, $R_{65}$ and $Q_{61}$ have the same meaning as $R_{12}$, $R_{13}$, $R_{14}$, $R_{15}$ and $Q_{11}$ in general formula (A-1), respectively; and $R_{66}$, $R_{67}$ and $R_{68}$ have the same meaning as $R_{16}$, $R_{17}$ and $R_{18}$ in general formula (A-1), respectively.

In the above general formulas (A-1), (A-2), (A-3), (A-4), (A-5) and (A-6), the halogen atom includes F, Cl, Br and I. The alkyl group is preferably an alkyl group having 1 to 30 carbon atoms (e.g., methyl, ethyl, n-propyl, n-octyl, n-butyl, t-butyl, isooctyl, n-dodecyl, isostearyl, n-hexyl, isopropyl, t-amyl) which may optionally have one or more substituent groups (examples of the substituent groups include F, Cl, Br, OH, COOH, CN, an ester group, an amino group, a carbonamido group, an acyl group, an aryl group, a sulfonamido group, an alkoxy group, an alkyl- or arylsulfonyl group, a carbamoyl group, a sulfamoyl group and a ureido group). The aryl group is preferably an aryl group having 6 to 10 carbon atoms (e.g., phenyl, naphthyl) which may optionally have one or more substituent groups (examples of the substituent groups include an alkyl group and those described above in the definition of the substituent groups for the alkyl group). The heterocyclic group is preferably a five-membered or six-membered heterocyclic group (e.g., a ring derived from imidazole, pyrazole, oxazole, isoxazole, pyridine, 1,2,4-triazole, 1,2,3,4-tetrazole, thiazole, benzoxazole, benzimidazole, benzthiazole, furan, tetrahydrofuran, thiophene, pyrrole, pyrrolidine, piperidine, morpholine or indole) which may optionally have one or more substituent groups (examples of the substituent groups include an alkyl group and those described above in the definition of the substituent groups for the alkyl group).

In the present invention, any dye residue in which one hydrogen atom has been removed in formulas (A-1) to (A-6) is applicable. In particular, the following hydrogen atom removing positions are preferred: the 5-position of the quinoneimine ring (the para-position of NHCONHR$_{11}$) in formula (A-1), the 5-position of the quinoneimine ring (the para-position of NHCOR$_{21}$) in formula (A-2), the 2-position of the quinoneimine ring (the para-position of R$_{36}$) in formula (A-3), the 2-position of the quinoneimine ring in formula (A-4), the 2- or 5-position of the naphthoquinoneimine ring in formula (A-5), and the 2- or 5-position of the imidazole ring or on the benzene ring when R$_{61}$ represents a phenyl group in formula (A-6).

Among the compounds represented by general formulas (A-1) to (A-6), the compounds of general formula (A-1) or (A-2) are preferred.

The divalent bonding group represented by L in formula (I) is preferably an alkylene group having 1 to 24 carbon atoms, more preferably 1 to 3 carbon atoms (e.g., methylene, ethylene, propylene) which may optionally have one or more substituent groups (examples of the substituent groups include an alkyl group having 1 to 18 carbon atoms such as methyl, ethyl, isopropyl, n-butyl, n-hexyl, n-dodecyl, n-hexadecyl, or isooctyl; a phenyl group; a benzyl group; a phenethyl group and an ester group such as ethoxycarbonyl or n-dodecyloxycarbonyl).

Specific examples of the bivalent bonding group represented by L in formula (I) include the following groups:

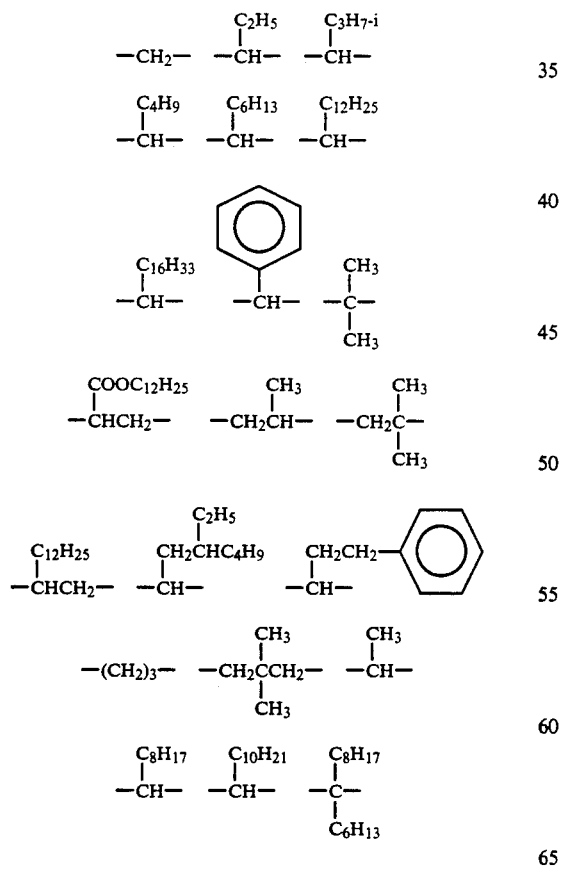

The non-metallic atomic group required for forming a three-membered to eight-membered heterocyclic group together with N, which is represented by Z may be a monocyclic ring or a condensed ring and is preferably a five-membered or six-membered heterocyclic ring (e.g., 1-pyrazolyl, 1-imidazolyl, 1,2,4-triazole-1-yl, 1,2,3,4-terazole-1-yl, benztriazole-1-yl, 1,2,3,4-tetrazole-2-yl) which may optionally have one or more substituent groups (examples of the substituent groups include an alkyl group such as methyl, ethyl, n-propyl; a phenyl group; a 4-chlorophenyl group; a 3,5-dichlorophenyl group; a benzyl group; a 1- or 2-naphthyl group and an ester group such as methoxycarbonyl or n-hexyloxycarbonyl).

Examples of

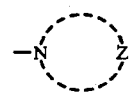

include the following groups.

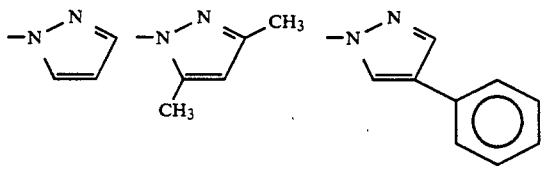

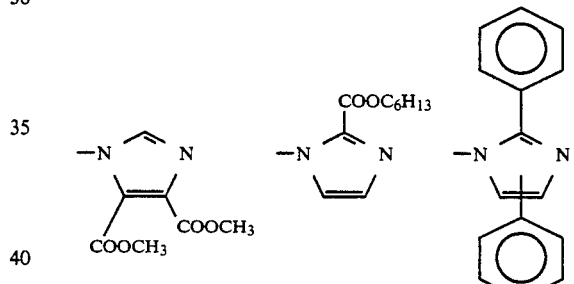

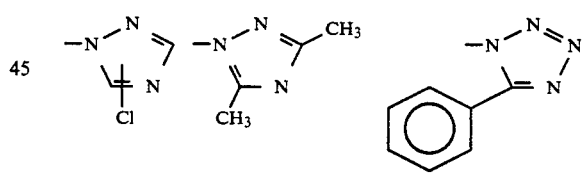

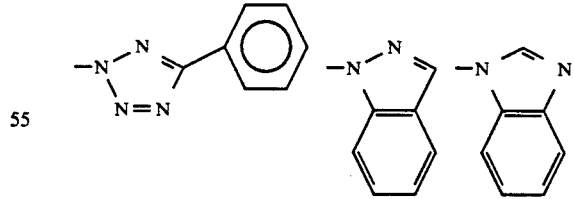

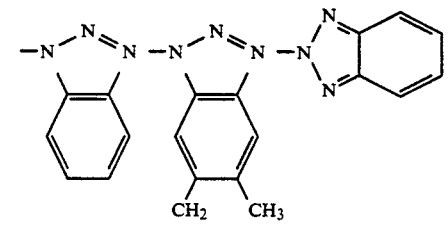

-continued
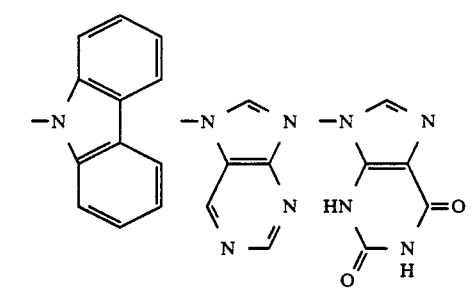
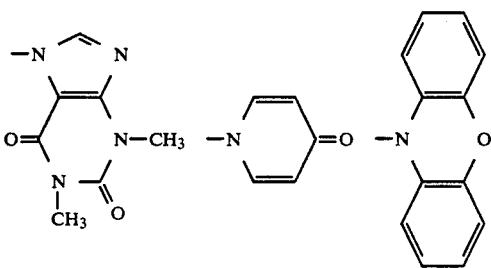
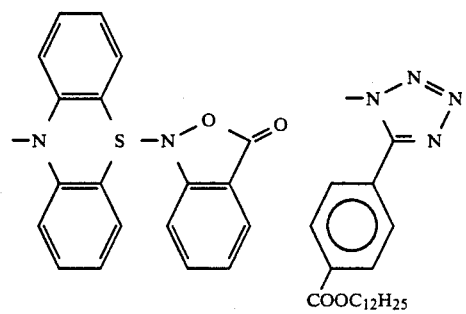
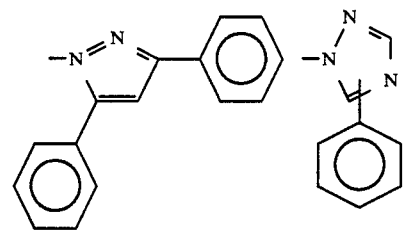
-continued
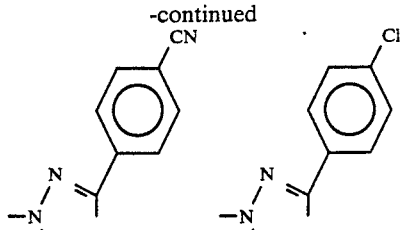
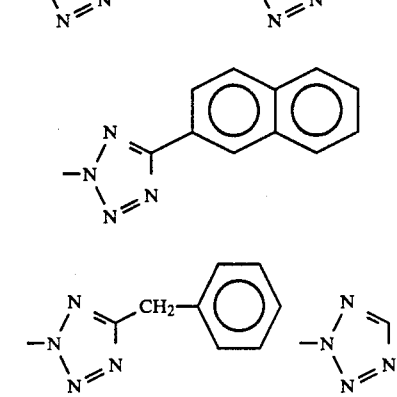
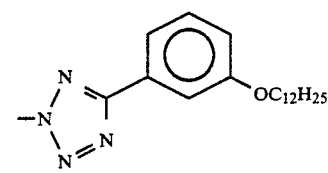
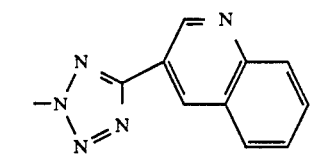
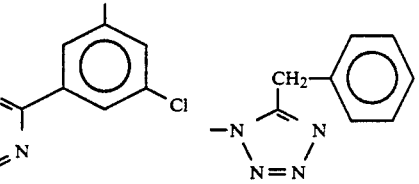
Examples of the dyes of general formula (I) include, but are not limited to, the following compounds:
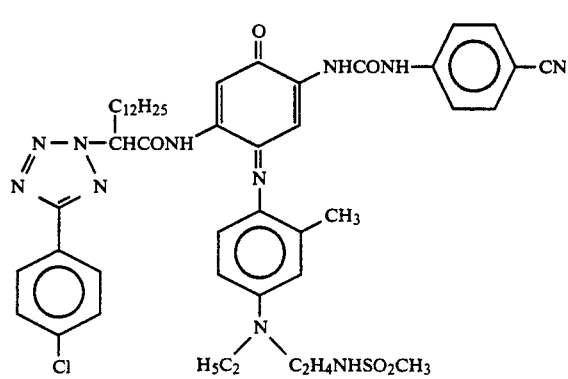
(I-1)

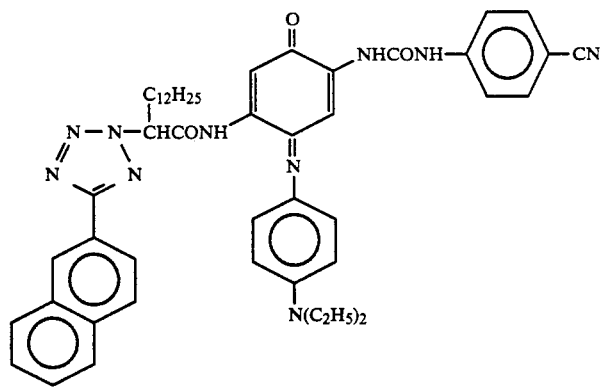
(I-2)
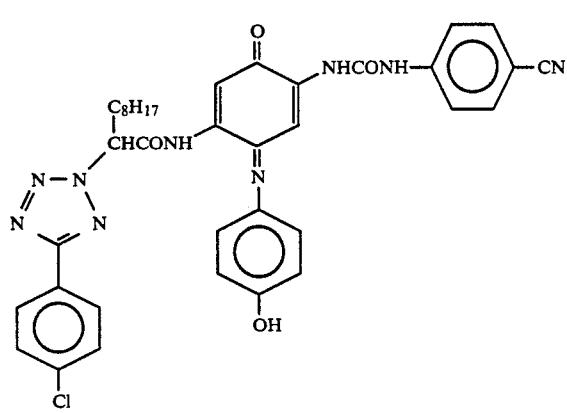
(I-3)
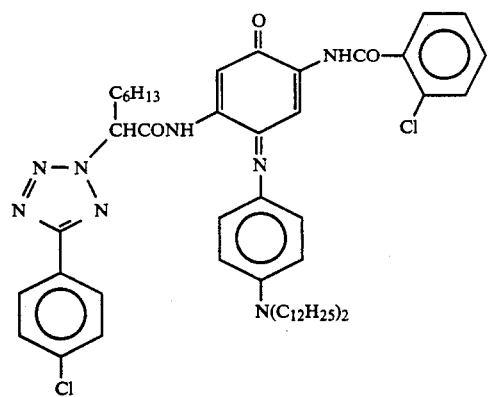
(I-4)
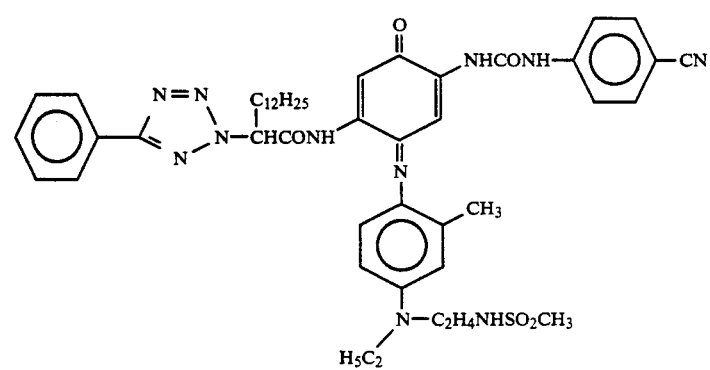
(I-5)

-continued
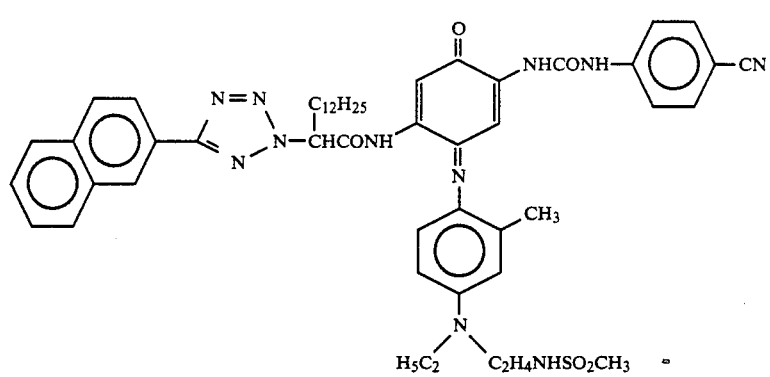
(I-6)
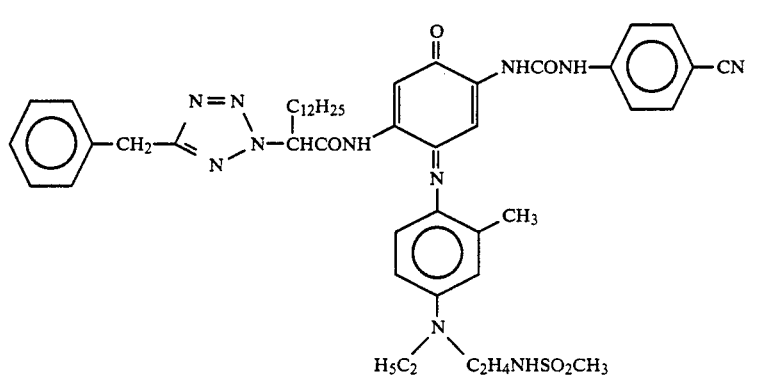
(I-7)
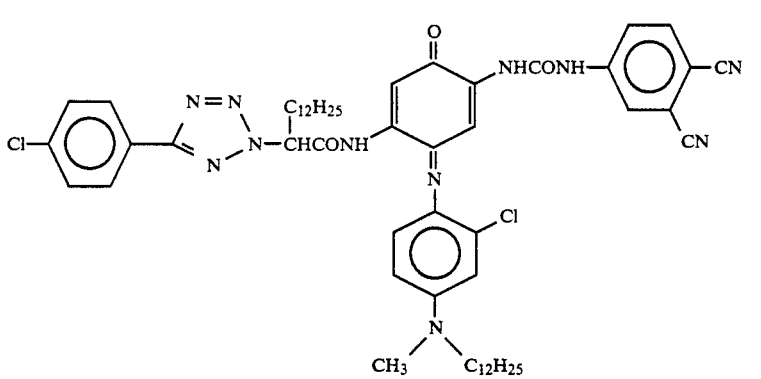
(I-8)
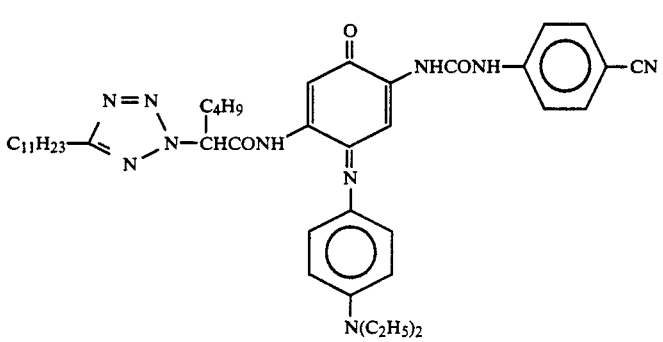
(I-9)

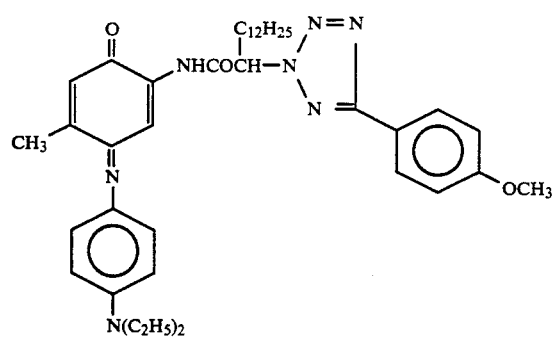
(I-10)
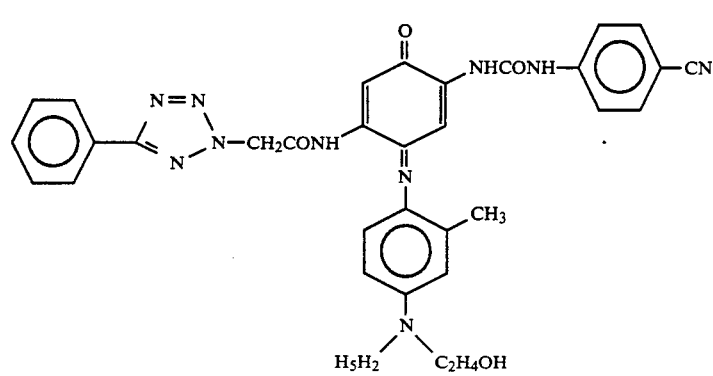
(I-11)
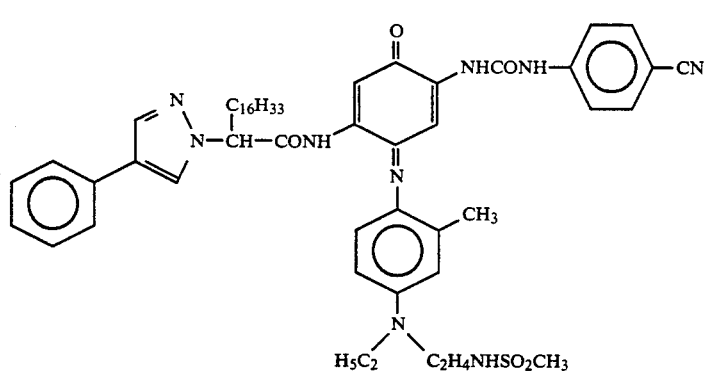
(I-12)
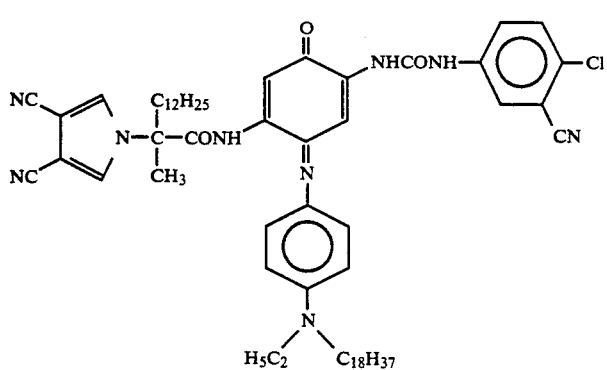
(I-13)

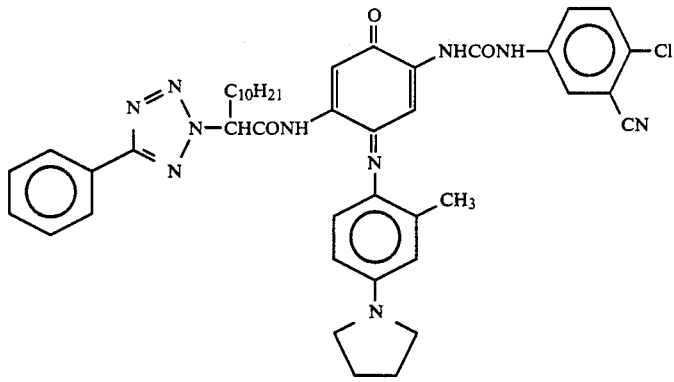
(I-14)
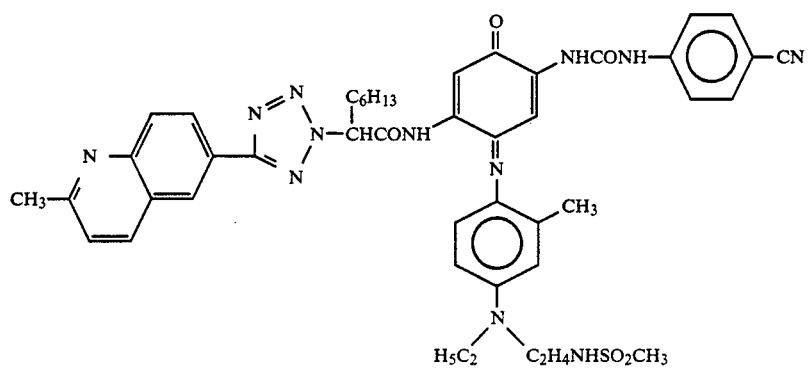
(I-15)
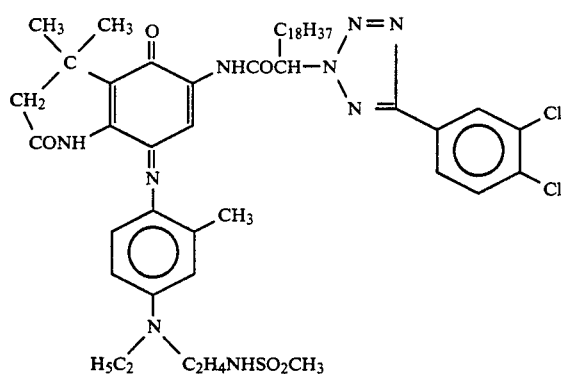
(I-16)
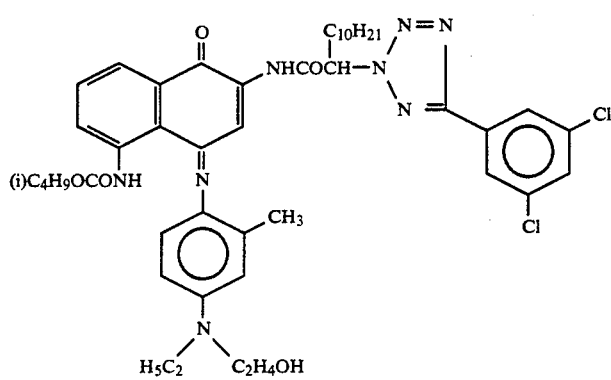
(I-17)

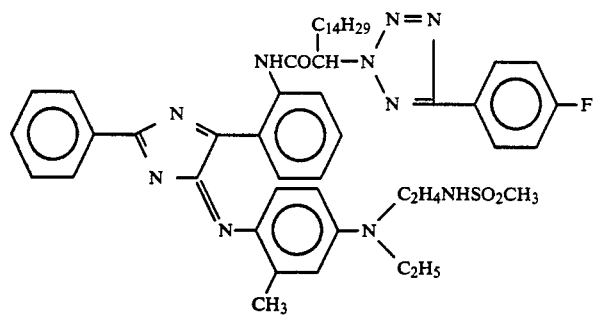

(I-18)

The dyes of general formula (I) can be synthesized by the methods described in JP-A-3-103477, JP-A-3-79672 and JP-A-2-129268 or the procedure of the following Synthesis Examples.

Synthesis Example 1

Synthesis of Compound (I-5)

An aqueous solution of sodium carbonate (530 mg) in water (10 ml), an aqueous solution of 4-(N-ethyl-N-methanesulfonamidoethylamino)-2-methylaniline 3/2 sulfate monohydrate (480 mg) in water (10 ml), and an aqueous solution of ammonium persulfate (684 mg) in water (10 ml) were added to an ethyl acetate-methanol (1:1 volume, 40 ml) solution of 2-{3''-(p-cyanophenyl)ureido}-5-{α-( 2'-(5'-phenyl )tetrazolyl)}tetradecanoylaminophenol (623 mg) at room temperature in a nitrogen gas stream. The resulting mixture was stirred for 30 minutes.

Water was added thereto, and the mixture was extracted twice with ethyl acetate. The organic layers were collected. The solvent was distilled off under pressure, and the residue was purified by means of column chromatography (developer:methylene chloride:methanol=20:1 volume) to obtain the desired Compound (I-5) (645 mg, 73%).

$\lambda$max=616 nm, $\epsilon$=2.85×10$^4$ (ethyl acetate)

Synthesis Example 2

Synthesis of Compound ( I-6 )

In the same manner as in Synthesis Example 1, Compound ( I-6 ) ( 780 mg, 83 % ) was obtained from 2-{3''-p-cyanophenyl)ureido}-5-}α- (2'-(5'-β'-naphthyl)tetrazolyl)}tetradecanoylaminophenol ( 673 mg), sodium carbonate (530 mg), 4-(N-ethyl-N-methanesulfonamidoethylamino)-2-methylaniline 3/2 sulfate monohydrate (480 mg) and ammonium persulfate (684 mg).

$\lambda$max=617 nm, $\epsilon$=2.61×10$^4$ (ethyl acetate)

Synthesis Example 3

Synthesis of Compound (I-7)

In the same manner as in Synthesis Example 1, Compound (I-7) (714 mg, 79%) was obtained from 2-{3''-(p-cyanophenyl)ureido}-5-{α-(2'-(5 '-benzyl)tetrazolyl)}-tetradecanoylaminophenol (637 mg), sodium carbonate (530 mg) , 4-{N-ethyl-N-methanesulfonamidoethylamino)-2-methylaniline 3/2 sulfate monohydrate (480 mg) and ammonium persulfate (684 mg).

$\lambda$max=620 nm, $\epsilon$=2.73×10$^4$ (ethyl acetate)

Synthesis Example 4

Synthesis of Compound (I-2)

A solution of N-bromosuccinimide (223 mg) in acetone (4 ml) was added to a solution of 2-{3''-(p-cyanophenyl)ureido}-5-(α-(2'-(5'-β'-naphthyl)tetrazolyl)} tetradecanoylaminophenol (673 mg), p-diethylaminoaniline sulfate (315 mg), methanol (15 ml) and triethylamine (378 ml). The mixture was stirred for 30 minutes.

A precipitated crystal was recovered by filtration and washed with methanol to obtain a crude crystal (450 mg). The crude crystal was recrystallized from a mixed solvent (20 ml) of methanol and chloroform (1:1 volume) to obtain the desired Compound (I-2) (440 mg, 53%).

$\lambda$max=600 nm, $\epsilon$=2.83×10$^4$ (ethyl acetate)

The dyes of the present invention can be dispersed in emulsion layers and other hydrophilic colloid layers (interlayer, protective layer, antihalation layer, filter layer, etc.) by various conventional methods described below.

(1) A method wherein the dyes of the present invention are directly dissolved or dispersed in the emulsion layers or the hydrophilic colloid layers, or a method wherein the dyes are dissolved or dispersed in an aqueous solution or a solvent, and then added to the emulsion layers or the hydrophilic colloid layers. The dyes may be dissolved in an appropriate solvent such as methyl alcohol, ethyl alcohol, propyl alcohol, methyl cellosolve, a halogenated alcohol (as described in JP-A-48-9715 and U.S. Pat. No. 3,756,830), acetone, water or pyridine or a mixed solvent thereof, and the resulting solution may be added to the emulsions.

(2) A method wherein the compounds are dissolved in oil, i.e., a high-boiling solvent which is substantially insoluble in water and has a boiling point of not lower than about 160° C., and the resulting solution is dispersed in a hydrophilic colloid solution. Examples of the high-boiling solvent which can be used include phthalic esters (e.g., dibutyl phthalate, dioctyl phthalate), phosphoric esters (e.g., diphenyl phosphate, triphenyl phosphate, tricresyl phosphate, dioctyl butyl phosphate), citric esters (e.g., tributyl acetylcitrate), benzoic esters (e.g., octyl benzoate), alkylamides (e.g., diethyllaurylamide), fatty acid eaters (e.g., dibutoxyethyl succinate, diethyl azelate) and trimesic acid esters (e.g., tributyl trimesate) as disclosed in U.S. Pat. No. 2,322,027. Further, there can be used organic solvents having a boiling point of about 30° to about 150° C., such as lower alkyl acetate (ethyl acetate, butyl acetate), ethyl propionate, sec-butyl alcohol, methyl isobutyl ketone, β-ethoxyethyl acetate, methyl cellosolve acetate and easily water-soluble alcohols (e.g., methanol, ethanol).

The dye and the high-boiling organic solvent are used in a ratio of preferably 10 to 1/10 by weight.

(3) A method wherein the dyes of the present invention and other additives are present in a polymer latex composition which is contained in the photographic emulsion layers and other hydrophilic colloid layers.

Examples of the polymer latex include polyurethane polymers and polymers obtained by polymerizing monomers. Examples of suitable vinyl monomers include acrylic esters (e.g., methyl acrylate, ethyl acrylate, butyl acrylate, hexyl acrylate, octyl acrylate, dodecyl acrylate, glycidyl acrylate), α-substituted acrylic esters (e.g., methyl methacrylate, butyl methacrylate, octyl methacrylate, glycidyl methacrylate), acrylamides (e.g., butyl acrylamide, hexyl acrylamide), α-substituted acrylamides (e.g., butyl methacrylamide, dibutyl methacrylamide), vinyl esters (e.g., vinyl acetate, vinyl butyrate), vinyl halides (e.g., vinyl chloride), vinylidene halides (e.g., vinylidene chloride), vinyl ethers (e.g., vinyl methyl ether, vinyl octyl ether), styrene, α-substituted styrenes (α-methylstyrene), substituted styrenes (e.g., hydroxystyrene, chlorostyrene, methylstyrene), ethylene, propylene, butylene, butadiene and acrylonitrile. These monomers may be used either alone or in a combination of two or more of them. These monomers may be used together with other vinyl monomers as minor monomer components. Examples of other vinyl monomers include itaconic acid, acrylic acid, methacrylic acid, hydroxyalkyl acrylates, hydroxyalkyl methacrylates, sulfoalkyl acrylates, sulfoalkyl methacrylates and styrenesulfonic acid.

The polymer latexes can be prepared according to the methods described in JP-B-51-39853 (the term "JP-B" as used herein means an "examined Japanese patent publication"), JP-A-51-59943, JP-A-53-137131, JP-A-54-32552, JP-A-54-107941, JP-A-55-133465, JP-A-56-19043, JP-A-56-19047, JP-A-56-126830 and JP-A-58-149038.

The dye and the polymer latex are used in a ratio of preferably 10 to 1/10 by weight.

(4) A method wherein the compounds are dissolved by using a surfactant.

Useful surfactants may be oligomer or polymers. The details of the polymers are described in JP-A-53-138726, JP-A-60-200251, JP-A-60-203935 and JP-A-60-158437.

(5) A method wherein hydrophilic polymers optionally together with the high-boiling solvents are used in place of the high-boiling solvents described above in (2). This method is described in U.S. Pat. No. 3,619,195 and West German Patent 1,957,467.

(6) A microcapsule method using polymers having a carboxyl group or sulfo group on the side chain thereof as described in JP-A-59-113434.

If desired, a hydrosol of lipophilic polymers as described in JP-B-51-39835 may be added to the hydrophilic colloid dispersions obtained above.

A typical examples of hydrophilic colloid which can be used in the present invention is gelatin. However, any of the hydrophilic colloids conventionally used in the field of photography can be used in the present invention.

Layers to which the dyes of the present invention may be added are emulsion layers, protective layers, back layers, antihalation layers and interlayers. The dyes may be added portionwise to the layers. Preferred layers to which the dyes are added are the emulsion layers and the back layers.

The dyes of the present invention are used in such an amount that an increase in transmission density caused by the addition of the dyes is preferably 0.06 to 0.01, more preferably 0.03 to 0.01. When the increase in transmission density exceeds 0.06, fog density is increased, clear degree is low, the silver tone is greatly affected by the tone regulator and the desired silver tone cannot be obtained. When the increase in transmission density is lower than 0.01, the degree of improvement in the tone is poor. The optimum amount of the dye to be added varies depending on the density of the support, the extinction coefficient of the dye, the maximum absorption wavelength of the dye and the tone of developed silver. However, the amount of the dye to be added is preferably $1 \times 10^{-7}$ to $1 \times 10^{-4}$ mol/m$^2$, more preferably $2 \times 10^{-7}$ to $2 \times 10^{-5}$ mol/m$^2$ and most preferably $5 \times 10^{-7}$ to $1.5 \times 10^{-5}$ mol/m$^2$.

The term "covering power" as used herein refers to a value obtained by dividing the transmission density of a uniformly blackened light-sensitive material by the amount of developed silver (mg/dm$^2$) in that area, and multiplying the quotient by 1000. The covering power of the silver halide emulsion is an important factor for emulsion manufactures. This is because when an emulsion having a high covering power is used, the amount of silver required for retaining a given transmission density can be reduced. The covering power in the present invention is at least 60, preferably at least 70.

Preferred emulsion grains in the present invention are tabular grains.

Any of silver chloride, silver chlorobromide, silver bromide, silver iodobromide and silver chloroiodobromide can be used as tabular silver halide grains used in the light-sensitive silver halide emulsions. However, silver bromide or silver iodobromide is preferred from the viewpoint of imparting high sensitivity, and an iodine content of 0 to 3.5 mol % is particularly preferred.

The tabular grains of the present invention have a grain diameter of preferably 0.3 to 2.0 μm, particularly preferably 0.5 to 1.5 μm in terms of the diameter of a circle having an area equal to the projected area of the grain. The tabular grains also have a grain thickness (a distance between parallel planes) of preferably 0.05 to 0.5 μm, particularly preferably 0.1 to 0.25 μm.

The tabular silver halide grains can be prepared by any one of the conventional methods, or a combination thereof.

The tabular silver halide emulsions can be easily prepared by referring to the methods described in JP-A-58-127921, JP-A-58-113927, JP-A-58-113928 and U.S. Pat. No. 4,439,520.

Further, the tabular silver halide emulsions can be obtained in the following manner.

Seed crystals, in which at least 40% by -weight of tabular grains exist, are formed in a relatively low pBr atmosphere, having a pBr value of not higher than 1.3. The seed crystals are grown while a silver salt solution and a halide solution are simultaneously added thereto and a similar pBr atmosphere to that described above is maintained.

It is desirable that the silver salt solution and the halide solution are carefully added so that new crystal nuclei are not formed during the course of the growth of the grains.

The size of the tabular silver halide grains can be adjusted by properly choosing the type and amount of a temperature-controlling solvent, or by controlling the addition rate of the silver salt and halide which is used during the course of the growth of the grains.

Among the tabular silver halide grains, monodisperse hexahedral tabular grains are particularly useful.

The details of the structure and preparation of the monodisperse hexahedral tabular grains used in the present invention are described in JP-A-63-151618.

Halogen conversion type (conversion type) grains as described in U.K. Patent 635,841 and U.S. Pat. No. 3,622,318 can be effectively used in the present invention. The degree of conversion of halogen is preferably 0.2 to 2 mol %, particularly preferably 0.2 to 0.4 mol % based on the amount of silver.

When silver iodobromide is used, it is particularly preferred that the grains have such a structure that the grains have a high iodide content layer in the interior thereof and/or on the surface layer thereof.

A silver halide emulsion having a higher sensitivity can be obtained by converting the surface layer of the tabular silver halide grains of the present invention.

As a method for halogen conversion, an aqueous solution of a halide which has a solubility product of halogen and silver, said solubility product being lower than that of a halogen composition on the surface layer of the grains before halogen conversion, is generally added to the tabular silver halide grains. For example, conversion can be effected by adding an aqueous solution of potassium bromide and/or an aqueous solution of potassium iodide to tabular silver chloride grains or tabular silver chlorobromide grains, or by adding an aqueous solution of potassium iodide to tabular silver bromide grains or tabular silver iodobromide grains. It is preferred that these aqueous solutions to be added have a low concentration of alkali halide. A concentration of not higher than 30% is preferred, and a concentration of not higher than 10% more preferred. It is preferred that the halide solution for conversion is added at a rate of not more than one mol % per min based on one mol of silver halide before halogen conversion. Further, a part or the whole of the sensitizing dye of the present invention and/or a silver halide-adsorbing material may be present during halogen conversion. Alternatively, fine grains of silver bromide, silver iodobromide or silver iodide may be added in place of the aqueous halide solution for conversion. These fine grains have a grain size of not larger than 0.2 μm, preferably not larger than 0.1 μm, and particularly preferably not larger than 0.05 μm.

The above-described halogen conversion methods of the present invention may be carried out singly or in combination. With regard to the halogen composition of the surface layer of the grain, the iodide content of the surface layer is preferably not higher than 3 mol %, particularly preferably not higher than 1.0 mol %.

When halogen conversion is carried out by the above-described methods, a method wherein solvents for silver halide are allowed to coexist is particularly effective. Preferred examples of the solvents include thioether compounds, thiocyanates and tetra-substituted ureas. Among them, the thioether compounds and the thiocyanates are particularly effective. The thiocyanates are used in an amount of preferably 0.5 to 5 g per mol of silver halide, and the thioether compounds are used in an amount of preferably 0.2 to 3 g per mol of silver halide.

In the present invention, a mixture of two or more tabular silver halide emulsions may be used. The particle sizes, halogen compositions, sensitivity, etc. of the emulsions to be mixed may be different. For example, a spherical or potato-form light-sensitive emulsion, and a light-sensitive silver halide emulsion comprising tabular grains having a grain size of at least three times the thickness of the grain, may be used in the same layer, or they may be used in different layers as described in JP-A-58-127921. When they are used in different layers, the light-sensitive silver halide emulsion comprising tabular grains may be positioned on either the layer which is nearer the support, or the layer which is farther from the support.

Cadmium salt, zinc salt, lead salt, thallium salt, iridium salt or a complex salt thereof, rhodium salt or a complex salt thereof, or iron salt or a complex salt thereof, may be allowed to coexist during the formation of the silver halide grains or the physical ripening thereof in the preparation of silver halide.

Further, solvents for silver halide, such as thiocyanates, thioether compounds, thiazolidinethione or tetra-substituted ureas may be allowed to coexist during the formation of the grains. The thiocyanates, the tetra-substituted ureas and the thioether compounds are preferred solvents in the present invention.

Emulsion sensitization methods and various additives which are conventionally used in the field of light-sensitive photographic materials can be used in the present invention without particular limitation. For example, those described in the following places of JP-A-2-68539 can be used. The following pages are taken from JP-A-2-68539, unless otherwise specified.

| Item | Place |
|---|---|
| 1 Chemical sensitization method | Line 13 of right upper column of page 10 to line 16 of left lower column of the same page |
| 2 Anti-fogging agent, stabilizer | Line 17 of left lower column of page 10 to line 7 of left upper column of page 11, and line 2 of left lower column of page 3 to the bottom of left lower column of page 4 |
| 3 Spectral sensitizing dye | Line 4 of right lower column of page 4 to the bottom of right lower column of page 8 |
| 4 Surfactant, antistatic agent | Line 14 of left upper column of page 11 to line 9 of left upper column of page 12 |
| 5 Matting agent, slip agent, plasticizer | Line 10 of left upper column of page 12 to line 10 of right upper column of the same page, and line 10 of left lower column of page 14 to line 1 of right lower column of the same page |
| 6 Hydrophilic colloid | Line 11 of right upper column of page 12 to line 16 of left lower column of the same page |
| 7 Hardening agent | Line 17 of left lower column of page 12 to line 6 of right upper column of page 13 |
| 8 Support | Line 7 to line 20 of right upper column of page 13 |
| 9 Dye, mordant | Line 1 of left lower column of page 13 to line 9 of left lower column of page 14 |
| 10 Development processing method | Line 7 of right upper column of page 16 to line 15 of left lower column of page 19 of JP-A-103037, and line 5 of right lower column of page 3 to line 10 of right upper column of page 6 of JP-A-2-115837 |

The present invention is now illustrated in greater detail with reference to the following examples which, however, are not to be construed as limiting the present invention in any way.

EXAMPLE 1

Preparation of Support A

The surface of a biaxially oriented blued polyethylene terephthalate film(*) of 175 μm in thickness was subjected to a corona discharge treatment. Both sides thereof were then coated with the following ingredients in such an amount as to give the coating weight described below. The coating was carried out by means of a wire bar coater. The coated support was dried at 175° C. for one minutes.

| | |
|---|---|
| Butadiene-styrene copolymer latex (butadiene/styrene = 31/69 by weight) | 0.32 g/m² |
| Sodium salt of 2,4-dichloro-6-hydroxy-s-triazine | 4.2 mg/m² |

(*) Polyethylene terephthalate film containing 1,4-bis-(2,6-diethylanilino)anthraquinone.

Subsequently, both sides of the support were coated with the following ingredients in such an amount as to give the coating weight described below. The coating was carried out by means of a wire bar coater. The so coated support was dried at 150° C. for one minute and is referred to herein as Support A.

| | |
|---|---|
| Gelatin | 80 mg/m² |
| Dye A (solid dispersion) | 16 mg/m² |
| 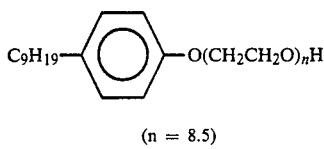 (n = 8.5) | 8 mg/m² |
| <br> | 0.27 mg/m² |

Dye A

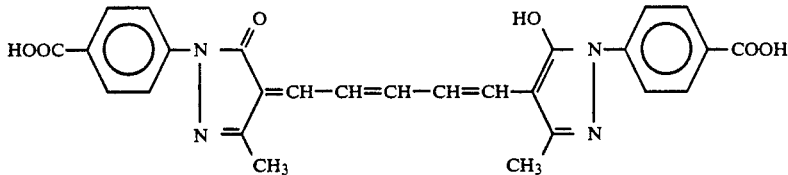

Preparation of Dye A solid dispersion

A 6.7% solution of Triton X-200 surfactant (TX-200) (53 g, a product of Rohm & Haas Co.) in water (434 ml) was placed in a 1.5 l bottle with a screw cap. 20 g of Dye A and zirconium oxide (ZrO) beads (800 ml, diameter: 2 mm) were added to the bottle. The bottle was tightly capped and placed in a mill, and the content crushed for 4 days.

The resulting mixture was added to a 12.5% aqueous gelatin solution (160 g), and the mixture was put in a roll mill for 10 minutes to reduce the foam. The resulting mixture was filtered to remove ZrO beads. The mixture, as such, still contained undesired particles having a particle size of 3 μm or more. Accordingly, the mixture was centrifuged at 5,000 rpm for 5 minutes to remove particles having a particle size of 1 μm or more.

Preparation of emulsion dispersion of dye

The dyes of the present invention and comparative dyes indicated in Table 1 were emulsified and dispersed by the following dispersion method.

A solution I was prepared by dissolving 300 mg of a dye in 40 cc of N,N-dimethylformamide. A solution II was prepared by dissolving 11 g of gelatin and 0.5 g of Emulsifying Dispersant A in 120 cc of water. Solution I was added to the inside of solution II over a period of 20 seconds with high-speed stirring in a homogenizer. After emulsifying the dispersion, 50 mg of 2-phenoxyethanol and 10 mg of Proxel were added thereto to obtain an emulsified dispersion of the dye.

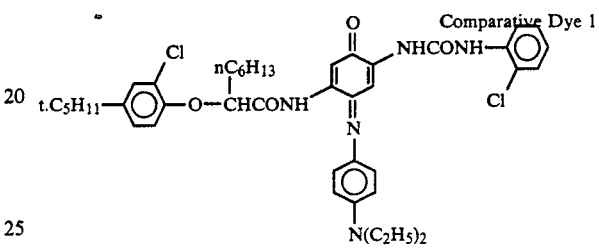

Comparative Dye 1

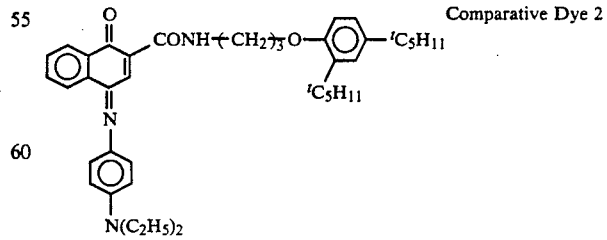

Comparative Dye 2

$$\underset{NaO_3S-CHCOOCH_2CH(C_2H_5)C_4H_9}{CH_2COOCH_2CH(C_2H_5)C_4H_9}$$

Emulsifying Dispersant A

Preparation of Emulsion A

To one liter of water, 4.5 g of potassium bromide, 20.6 g of gelatin and 2.5 cc of a 5% aqueous solution of thioether HO(CH$_2$)$_2$S(CH$_2$)$_2$S(CH$_2$)$_2$OH were added. To the resulting solution kept at 65° C., an aqueous solution of 3.43 g of silver nitrate and an aqueous solution containing 2.97 g of potassium bromide and 0.363 g of potassium iodide were added over a period of 37 seconds by a double jet process while stirring. Subsequently, 0.9 g of potassium bromide was added thereto. Subsequently, an aqueous solution containing 4.92 g of silver nitrate was added to the resulting mixture over a period of 13 minutes. After the temperature of the mixture was raised to 70° C., 18 cc of a 25% ammonia solution was added thereto. 17 cc of 100% acetic acid solution was then added to neutralize the mixture. Subsequently, an aqueous solution of 133.49 g of silver nitrate and an aqueous solution of potassium bromide were added thereto over a period of 35 minutes by means of a controlled double jet process while keeping the potential at a pAg of 8.2. The addition was carried out at such an accelerating rate that the flow rate at the time of completion of the addition was 2.6 times the flow rate at the time of the commencement of the addition. After completion of the addition, 15 cc of 2N potassium thiocyanate solution was added thereto. Subsequently, 38.5 cc of a 1% aqueous solution of potassium iodide was added to the resulting mixture over a period of 30 seconds. The temperature of the mixture was then lowered to 35° C. After soluble salts were removed by a precipitation method, the temperature was raised to 40° C., and 68 g of gelatin and 2.35 g of phenoxyethanol were added thereto. The value of pAg was adjusted to 8.20 by potassium bromide. The thus-prepared silver halide grains were tabular grains and had a grain size of 1.4 μm in terms of the average diameter of a circle having an area equal to the projected area of the grain and an average grain thickness of 0.20 μm.

The temperature of the emulsion was raised to 56° C. After the pH thereof was adjusted to 5.9, 4-hydroxy-6-methyl-1,3,3a,7-tetrazaindene and Sensitizing Dye (1) were added thereto. After 10 minutes, sodium thiosulfate, potassium thiocyanate and chloroauric acid were added to the resulting mixture for chemical sensitization, thus obtaining Emulsion A.

Sensitizing Dye (1)

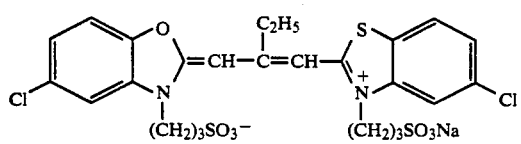

Preparation of Emulsion Coating Solution

The following reagents in the amounts given below were added to Emulsion A to prepare a coating solution, each amount being per mol of silver halide.

| Dye emulsion | Indicated in Table 1 |
|---|---|
| Polymer latex (poly(ethyl acrylate-methacrylic acid) = 97/3) | 20.0 g |
| Hardening agent (1,2-Bis(vinylsulfonyl-acetamide)ethane) | 2.4 g |
| 2,6-Bis(hydroxyamino)-4-diethyl-amine-1,3,2-triazine | 76 mg |
| Polysodium acrylate (average molecular weight: 41,000) | 2.1 g |
| Polysodium styrenesulfonate (average molecular weight: 600,000) | 1.0 g |
| Dextran (molecular weight: 39,000) | 23.6 g |
| Trimethylol propane | 9.8 g |
| Potassium hydroquinonemonosulfonate | 9.7 g |
| C$_8$H$_{17}$—⟨C$_6$H$_4$⟩—(OCH$_2$CH$_2$)$_3$SO$_3$Na | 0.6 g |
| (mercapto tetrazole compound with SO$_3$Na) | 32 mg |

Preparation of Photographic Material

The above emulsion coating solution and a coating solution for a surface protective layer were simultaneously coated on both sides of Support A in such an amount so as to give a coating weight of the emulsion coating of 2 g/m$^2$ (in terms of silver) per one side. The surface protective layer was coated in such an amount as to give the following weights. The above procedures resulted in Samples 1 to 12 shown in Table I.

| Composition of Surface Protective Layer | |
|---|---|
| Ingredient | Coating weight |
| Gelatin | 1.138 g/m$^2$ |
| Dextran (average molecular weight: 39,000) | 0.228 g/m$^2$ |
| 4-Hydroxy-6-methyl-1,3,3a,7-tetrazaindene | 0.0155 g/m$^2$ |
| Polysodium acrylate (average molecular weight: 41,000) | 0.023 g/m$^2$ |
| C$_8$H$_{17}$—⟨C$_6$H$_4$⟩—(OCH$_2$CH$_2$)$_3$SO$_3$Na | 0.0225 g/m$^2$ |
| C$_{16}$H$_{33}$O(CH$_2$CH$_2$O)$_{10}$H | 0.035 g/m$^2$ |
| C$_8$F$_{17}$SO$_2$N(C$_3$H$_7$)(CH$_2$CH$_2$O)$_4$(CH$_2$)$_4$SO$_3$Na | 0.0005 g/m$^2$ |
| C$_8$F$_{17}$SO$_3$K | 0.0053 g/m$^2$ |
| Polymethyl methacrylate (average particle size: 3.7 μm) | 0.088 g/m$^2$ |
| Proxel | 0.0006 g/m$^2$ |

Evaluation of performance

Both sides of each of the photographic materials 1 to 12 were exposed to green light having a peak at 550 nm through a wedge for 1/10 second. Subsequently, the photographic materials were processed for 45 seconds (dry-to-dry) by using an automatic processor FPM-9000, a developing solution RD7 and a fixing solution Fuji-F, the processor, the developing solution and the fixing solution being manufactured by Fuji Photo Film Co., Ltd. The processing was carried out under such conditions that the temperature of the developing solution was 35° C., the temperature of the fixing solution was 30° C., and the temperature of the washing solution was 20° C. The density of the exposure amount was measured to determine sensitivity.

Increase D in density caused by the addition of the dye

The increase D in density caused by the addition of the dye was determined by the difference in the value of green density between a dye-containing sample and a sample without a dye after unexposed samples were processed in the processor as described above.

Evaluation of covering power

The samples were exposed and developed under the above-described exposure and development conditions. The amount of silver in the Dmax area was measured by fluorescent X-ray method. The covering power was determined by dividing the density by the amount of developed silver (mg/dm$^2$), and multiplying the quotient by 10,000.

Evaluation of tone of developed silver

The evaluation of the tone of developed silver was made by observing a sample which was uniformly exposed over a relatively wide area so as to give a transmission blackened density of 1.0 under the above-described development conditions.

Evaluation of outward bending kink desensitization

Before the above-described exposure and development were carried out, the coated sample was conditioned at 25° C. and 60% RH for 2 hours, pressed against a stainless steel rod having a diameter of 5 mm, and bent at an angle of 30 degrees for 10 seconds. The sample was then exposed and developed under the above-described conditions, the emulsion layer on the bent rod side was removed, and the sensitivity of the sample was measured. Separately, the coated sample was exposed and developed under the above-described conditions without being subjected to the above bending operation, one side of the emulsion layers was then removed, and the sensitivity of the sample was measured. A difference in sensitivity between the bent sample and the sample which was not bent was determined. The difference in sensitivity was calculated by a difference in the logarithm value of the exposure amount giving a density of (Fog+0.1).

EXAMPLE 2

| | Amount |
|---|---|
| Composition of Back Layer | |
| Dye emulsion (prepared in the similar manner disclosed in Example 1) | Indicated in Table 2 |
| Gelatin | 3.4 g/m$^2$ |

[Chemical structure: dye with HOOC, CH=CH=CH linkage between two pyrazolone rings with phenyl-SO$_3$K substituents] — 40 mg/m$^2$

[Chemical structure: dye with HOOC, CH=CH—CH=CH—CH linkage between two pyrazolone rings with phenyl-SO$_3$K substituents, COOH] — 100 mg/m$^2$

| | |
|---|---|
| Polysodium styrenesulfonate (average molecular weight: 600,000) | 15 mg/m$^2$ |
| 1,2-Bis(vinylsulfonylacetamido)ethane | 68 mg/m$^2$ |
| Colloidal silica | 0.4 g/m$^2$ |
| Polymer latex (poly(ethyl acrylate/ methacrylic acid) = 97/3) | 2 g/m$^2$ |
| Composition of Back Surface Protective Layer | |
| Gelatin | 0.57 g/m$^2$ |
| Polymethyl methacrylate (average particle size: 3.7 μm) | 0.09 g/m$^2$ |
| C$_{16}$H$_{33}$O—(CH$_2$CH$_2$O)$_{10}$H | 25 mg/m$^2$ |

TABLE 1

| Sample No. | Dye Emulsion Type of dye | Coating amount of dye (mol/m$^2$) | ΔDv | Covering power | Sensitivity | Desensitization by outward bending Δ(log E) | Tone of developed silver | |
|---|---|---|---|---|---|---|---|---|
| 1 | — | — | — | 90 | 100 | 0 | yellowish black | Comp. Ex. |
| 2 | Comparative Dye 1 | 0.1 × 10$^{-5}$ | 0.002 | 90 | 100 | 0.02 | yellowish black | " |
| 3 | Comparative Dye 1 | 1.2 × 10$^{-5}$ | 0.2 | 90 | 98 | 0.10 | slightly yellowish black | " |
| 4 | Comparative Dye 1 | 5.0 × 10$^{-5}$ | 0.09 | 89 | 95 | 0.36 | bluish black | " |
| 5 | Comparative Dye 2 | 1.0 × 10$^{-5}$ | 0.02 | 90 | 97 | 0.13 | slightly yellowish black | " |
| 6 | (I-2) | 0.4 × 10$^{-5}$ | 0.02 | 90 | 100 | 0 | neutral black | Invention |
| 7 | (I-4) | 0.4 × 10$^{-5}$ | 0.02 | 90 | 100 | 0 | neutral black | " |
| 8 | (I-5) | 0.5 × 10$^{-5}$ | 0.02 | 90 | 100 | 0.01 | neutral black | " |
| 9 | (I-4) | 1.6 × 10$^{-5}$ | 0.08 | 91 | 99 | 0 | bluish black | Comp. Ex. |
| 10 | (I-2) (I-4) | 0.2 × 10$^{-5}$ 0.2 × 10$^{-5}$ | 0.02 | 90 | 100 | 0 | neutral black | Invention |
| 11 | (I-10) | 0.7 × 10$^{-5}$ | 0.03 | 90 | 100 | 0.01 | neutral black | " |
| 12 | (I-13) | 0.4 × 10$^{-3}$ | 0.02 | 90 | 100 | 0 | neutral black | " |

-continued

| | Amount |
|---|---|
| 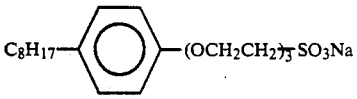 | 13 mg/m$^2$ |
| $C_8F_{17}SO_2N(C_3H_7)$—$(CH_2CH_2O)_4$—$(CH_2)_4SO_3Na$ | 0.3 mg/m$^2$ |

Preparation of Photographic Material

The above dye coating solution for the back layer and the above surface protective layer for the back layer were simultaneously coated on one side of a blue-colored transparent polyethylene terephthalate support of 175 μm thick to form the back side.

An emulsion coating solution having the same formulation as that of Example 1 was prepared by using the same Emulsion A as that of Example 1 except that the dye emulsion of Example 1 was not added.

Subsequently, the emulsion coating solution and the same surface protective layer as that of Example 1 were simultaneously coated on the opposite side of the support to the above back side in such an amount as to give a coating weight of 4 g/m$^2$ in terms of silver, thus obtaining Samples 13 to 22 shown in Table 2.

Evaluation of Coated Samples

In the same way as in Example 1, sensitivity, ΔDv and the covering power were determined and the tone of the developed silver was observed, by exposing only one side of the sample to light.

TABLE 2

| Sample No. | Dye Emulsion Type of dye | Coating amount of dye (mol/m$^2$) | ΔDv | Covering power | Sensitivity | Tone of developed silver | |
|---|---|---|---|---|---|---|---|
| 13 | — | — | — | 90 | 100 | yellowish black | Comp. Ex. |
| 14 | Comparative Dye 1 | 0.1 × 10$^{-5}$ | 0.002 | 90 | 100 | yellowish black | " |
| 15 | Comparative Dye 1 | 1.4 × 10$^{-5}$ | 0.03 | 90 | 100 | slightly yellowish black | " |
| 16 | Comparative Dye 2 | 1.5 × 10$^{-5}$ | 0.03 | 90 | 100 | slightly yellowish black | " |
| 17 | (I-2) | 0.4 × 10$^{-5}$ | 0.02 | 90 | 100 | neutral black | Invention |
| 18 | (I-4) | 0.4 × 10$^{-5}$ | 0.02 | 90 | 100 | neutral black | " |
| 19 | (I-9) | 0.4 × 10$^{-5}$ | 0.02 | 90 | 100 | neutral black | " |
| 20 | (I-4) (I-9) | 0.2 × 10$^{-5}$ 0.3 × 10$^{-5}$ | 0.22 | 90 | 100 | neutral black | " |
| 21 | (I-13) | 0.6 × 10$^{-5}$ | 0.03 | 90 | 100 | neutral black | " |
| 22 | (I-16) | 0.7 × 10$^{-5}$ | 0.03 | 90 | 100 | neutral black | " |

It is apparent from Table 1 that when the dyes of the present invention are used, the yellowing of the tone of developed silver can be reduced, tone can be improved and desensitization caused by outward bending can be reduced. In the Comparative Examples, when the comparative dyes are added in such an amount as to reduce the yellowing of the tone of the developed dye, the degree of desensitization caused by outward bending becomes worse, while when the amounts of the comparative dyes are reduced so as not to cause desensitization by outward bending, the tone of developed silver becomes yellow.

It is also apparent from Table 2 of Example 2 that the tone of the developed silver can be improved even when the dyes of the present invention are added to the back layer.

It will be understood from the above disclosure that when the dyes of general formula (I) are added to photographic materials having at least one silver halide emulsion layer having a covering power of at least 60, photographic materials can be obtained which, after development, form a silver image that is prevented from yellowing and which scarcely cause desensitization by outward bending.

While the invention has been described in detail and with reference to specific embodiments thereof, it is apparent to one skilled in the art that various changes and modifications can be made therein without departing from the spirit and scope of the present invention.

What is claimed is:

1. A silver halide photographic material comprising a support having on at least one side thereof at least one silver halide photographic emulsion layer, wherein said silver halide emulsion layer has a covering power of at least 60, and wherein a dye of the following general formula (I) is contained in said silver halide emulsion layer or in another hydrophilic layer, or in both of said layers, in an amount of $1 \times 10^{-7}$ to $1 \times 10^{-4}$ mol/m$^2$:

(I)

wherein A represents a dye residue formed by removing one hydrogen atom from an indophenol or indoaniline dye; L represents a divalent bonding group; and Z represents a non-metallic atomic group required for forming a three-membered to eight-membered heterocyclic ring together with N, provided that a carbonyl group is not directly bonded to N in the heterocyclic ring.

2. The silver halide photographic material of claim 3, wherein the dye residue is formed from a compound represented by the following formula (A-1):

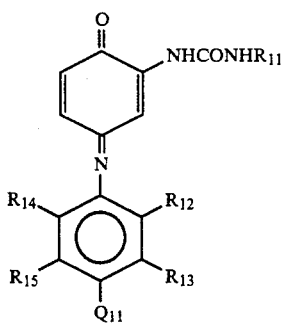

(A-1)

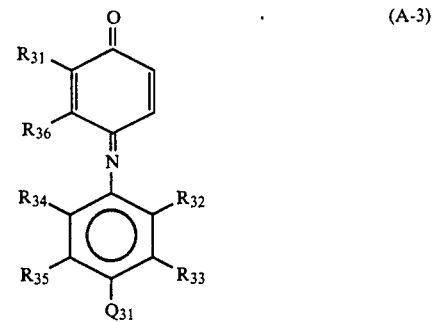

(A-3)

wherein $R_{11}$ represents an aryl group; $R_{12}$, $R_{13}$, $R_{14}$ and $R_{15}$ may be the same as or different from each other, and each represents a hydrogen atom, an alkyl group, an aryl group, $OR_{16}$, $NR_{16}R_{17}$, $NR_{17}COR_{18}$, $NR_{17}SO_2R_{18}$, $SR_{18}$, $SO_2R_{18}$, $COOR_{16}$, $CONR_{16}R_{17}$, $SO_2NR_{16}R_{17}$, $NR_{17}COOR_{18}$, a halogen atom, and a cyano or nitro group; $Q_{11}$ represents a hydroxyl group or $NR_{16}R_{17}$; $R_{12}$ and $R_{13}$, $R_{13}$ and $Q_{11}$, or $R_{15}$ and $Q_{11}$ may be combined together to form a five-membered or six-membered ring; $R_{16}$ and $R_{17}$ each represents a hydrogen atom or a group of $R_{18}$; $R_{18}$ represents an alkyl group, an aryl group or a heterocyclic group; or $R_{16}$ and $R_{17}$, or $R_{17}$ and $R_{18}$ may be combined together to form a five-membered or six-membered ring.

3. The silver halide photographic material of claim 1, wherein the dye residue is formed from a compound represented by the following formula (A-2):

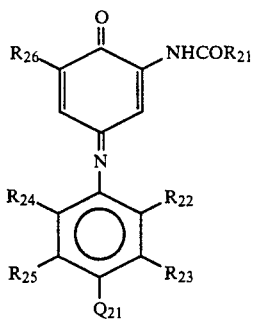

(A-2)

wherein $R_{21}$ represents an alkyl group, an aryl group or a heterocyclic group; $R_{26}$ represents a halogen atom, $OR_{27}$, $NR_{27}R_{28}$, $NR_{28}COR_{29}$ or $NR_{28}SO_2R_{29}$; $R_{22}$, $R_{23}$, $R_{24}$, $R_{25}$ and $Q_{21}$ may be the same as or different from each other, and each represents a hydrogen atom, an alkyl group, an aryl group, $OR_{16}$, $NR_{16}R_{17}$, $NR_{17}COR_{18}$, $NR_{17}SO_2R_{18}$, $SR_{18}$, $SO_2R_{18}$, $COOR_{16}$, $CONR_{16}R_{17}$, $SO_2NR_{16}R_{17}$, $NR_{17}COOR_{18}$, a halogen atom, and a cyano or nitro group; $Q_{21}$ represents a hydroxyl group or $NR_{16}R_{17}$; $R_{22}$ and $R_{23}$, $R_{23}$ and $Q_{21}$, or $R_{25}$ and $Q_{21}$ may be combined together to form a five-membered or six-membered ring; $R_{27}$ and $R_{28}$ each represents a hydrogen atom or a group of $R_{29}$; $R_{29}$ represents an alkyl group, an aryl group or a heterocyclic group; or $R_{27}$ and $R_{28}$, or $R_{28}$ and $R_{29}$ may be combined together to form a five-membered or six-membered ring.

4. The silver halide photographic material of claim 1, wherein the dye residue is formed from a compound represented by one of the following formulas (A-3), (A-4), (A-5) and (A-6):

wherein $R_{31}$ represents a hydrogen atom, a halogen atom, $OR_{37}$, $NR_{37}R_{38}$, $NR_{38}COR_{39}$ or $NR_{38}SO_2R_{39}$; $R_{36}$ represents a hydrogen atom, an alkyl group, $OR_{37}$ or $NR_{38}R_{39}$; $R_{32}$, $R_{33}$, $R_{34}$, $R_{35}$ and $Q_{31}$ may be the same as or different from each other and each represents a hydrogen atom, an alkyl group, an aryl group, $OR_{16}$, $NR_{16}R_{17}$, $NR_{17}COR_{18}$, $NR_{17}SO_2R_{18}$, $SR_{18}$, $SO_2R_{18}$, $COOR_{16}$, $CONR_{16}R_{17}$, $SO_2NR_{16}R_{17}$, $NR_{17}COOR_{18}$, a halogen atom, and a cyano or nitro group; and $R_{37}$ and $R_{38}$ each represents a hydrogen atom or a group of $R_{39}$; $R_{39}$ represents an-alkyl group, an aryl group, or a heterocyclic group; or $R_{37}$ and $R_{38}$, or $R_{38}$ and $R_{39}$ may be combined together to form a five-membered or six-membered ring:

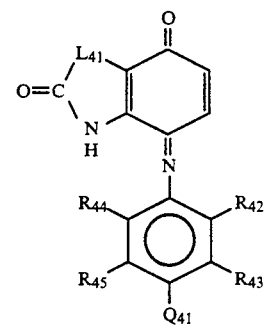

(A-4)

wherein $L_{41}$ represents an alkylene group having 1 to 24 carbon atoms, a carbonylimino group having 1 to 24 carbon atoms or an imino group having 0 to 24 carbon atoms; and $R_{42}$, $R_{43}$, $R_{44}$, $R_{45}$ and $Q_{41}$ have the same meaning as $R_{32}$, $R_{33}$, $R_{34}$, $R_{35}$ and $Q_{31}$ in general formula (A-3), respectively;

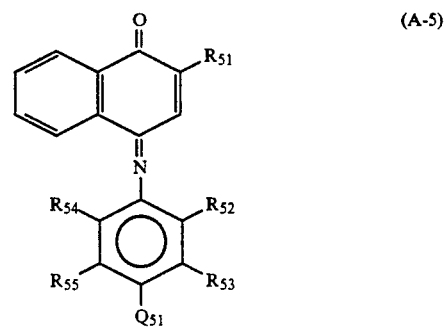

(A-5)

wherein $R_{51}$ represents a hydrogen atom, a halogen atom, $CONR_{56}R_{57}$ or $SO_2NR_{56}R_{57}$; $R_{52}$, $R_{53}$, $R_{54}$, $R_{55}$ and $Q_{51}$ have the same meaning as $R_{32}$, $R_{33}$, $R_{34}$, $R_{35}$ and $Q_{31}$ in general formula (A-3), respectively; and $R_{56}$ and $R_{57}$ have the same meaning as $R_{37}$ and $R_{38}$ in general formula (A-3), respectively;

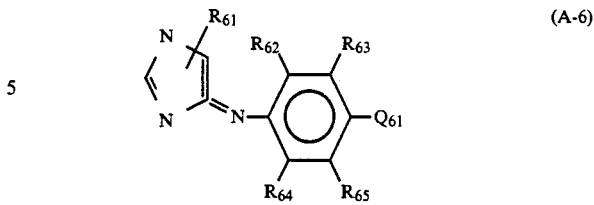

wherein $R_{61}$ represents a hydrogen atom, an alkyl group, an aryl group, a heterocyclic group, $NR_{67}COR_{68}$, $NR_{67}SO_2R_{68}$, $NR_{66}CONR_{66}R_{67}$ or $NR_{67}COOR_{68}$; $R_{62}$, $R_{63}$, $R_{64}$, $R_{65}$ and $Q_{61}$ have the same meaning as $R_{32}$, $R_{33}$, $R_{34}$, $R_{35}$ and $Q_{31}$ in general formula (A-3), respectively and $R_{66}$, $R_{67}$ and $R_{68}$ have the same meaning as $R_{36}$, $R_{37}$ and $R_{38}$ in general formula (A-3), respectively.

* * * * *